United States Patent [19]

Evans et al.

[11] Patent Number: 5,160,463
[45] Date of Patent: Nov. 3, 1992

[54] METHOD OF MANUFACTURING A CONTACT LENS

[75] Inventors: John M. Evans, Fremont; Ashok R. Thakrar, San Jose, both of Calif.

[73] Assignee: Pilkington Visioncare, Inc., Menlo Park, Calif.

[21] Appl. No.: 732,129

[22] Filed: Jul. 18, 1991

Related U.S. Application Data

[63] Continuation-in-part of Ser. No. 605,704, Oct. 30, 1990, abandoned.

[51] Int. Cl.⁵ .............................................. B29D 11/00
[52] U.S. Cl. ...................................... 264/17; 264/2.6; 351/162
[58] Field of Search .................... 264/1.7, 2.6; 351/162

[56] References Cited

U.S. PATENT DOCUMENTS

| | | | |
|---|---|---|---|
| 3,679,504 | 7/1972 | Wichterle | 156/62 |
| 4,582,402 | 4/1986 | Knapp | 351/162 |
| 4,640,805 | 2/1987 | Neefe | 264/1.1 |
| 4,704,017 | 11/1987 | Knapp | 351/162 |
| 5,034,166 | 7/1991 | Rawlings et al. | 264/1.7 |

FOREIGN PATENT DOCUMENTS 0357062 3/1990 European Pat. Off. ............. 264/1.7

Primary Examiner—James Lowe
Attorney, Agent, or Firm—Burns, Doane, Swecker & Mathis

[57] ABSTRACT

A method of manufacturing a contact lens with an iris simulating pattern by moulding comprising applying to the mould at least two differing designs so as to form an overall pattern. This overall pattern is transferred to the surface or surfaces of the contact lens during moulding and curing thereof, where the designs transferred interact with each other to substantially cover the iris and produce a coloured natural simulation of the iris of the eye when in use.

20 Claims, 4 Drawing Sheets

METHOD OF MANUFACTURING A CONTACT LENS

This application is a continuation-in-part of application Ser. No. 07/605,704, filed Oct. 30, 1990, now abandoned.

RELATED APPLICATIONS

This invention relates to the manufacture of contact lenses and, in particular, a method of manufacturing contact lenses with an iris simulating pattern.

BACKGROUND

In conventional designs of contact lenses which are tinted, and which are used for protecting the eye or for cosmetic purposes, the tinting is achieved by use of dyes and/or pigments within the body of the contact lens, or placed upon the surface of the lens to, change or enhance the colour of the iris of the eye. Also it has recently been suggested that the colour of the iris of the eye can be masked and the apparent colour of the iris changed by using a combination of dye and/or pigment and a reflective opaque material, such as titanium dioxide.

The drawback with both of these conventional designs of contact lens is that although they change the apparent colour of the iris, the (apparent) colour they give to the iris is quite clearly false as the contact lens so manufactured do not cater for the variegated pattern and structure that is present within the true iris.

In an attempt to rectify this drawback Julius Knapp in his U.S. Pat. Nos. 4,720,188, 4,704,017 and 4,582,402 is suggesting that only a portion of the natural iris is masked by the lens so that the iris pattern is clearly visible through the tinted portion of the lens. His belief is that in this way a tinted lens can be provided with a natural variegated iris pattern which gives the tinted contact lens a more natural appearance in the eye. In order to exemplify this he suggests the use of a dot matrix approach to tinting the required portion of the contact lens. In this particular case over the portion of the lens which is to cover the iris of the eye the lens has applied to the surface thereof a dot matrix pattern which does not totally cover the portion so that a significant part of the lens in this portion allows light to be transmitted therethrough so enabling visualisation of the variagated structure of the iris.

The drawbacks with this are that the contact lens again appears false, and because of the spacing in the dot matrix pattern which allows the structure of the iris to show through. In some circumstances an the appearance of coloured islands floating on the surface of the cornea is given.

Additionally the tinting onto the finished lens surface renders the patterned lens more susceptible to problems such as deposit formation, poor comfort, loss of pattern on cleaning and wearing etc.

Also in European Patent Application No. 357062 there is disclosed a method of manufacturing coloured contact lenses in which the corresponding iris design is incorporated within the body of the lens in its finished state.

SUMMARY

The present invention is concerned with providing a method of manufacturing a contact lens with an iris simulating pattern which is not reliant upon the structure of the natural iris of the eye to give a natural appearance in a different colour.

In accordance with the present invention a method of manufacturing a contact lens with an iris simulating pattern by moulding with respect to a moulding surface, comprises applying to the moulding surface at least two differing designs to form an overall pattern wherein the designs applied are transferred onto the surface of the contact lens in contact with the mould surface during the moulding and curing of the contact lens, and the designs transferred to the contact lens interact with each other to substantially cover the iris and produce a coloured natural simulation of the iris of the eye when in use.

In accordance with the present invention, the moulding of the contact lens may be used to form one or both of the contact lens surfaces. In the situation where only one of the contact lens surfaces is formed by the moulding, clearly this is the surface onto which the designs are transferred. Futher, the second contact lens surface is formed in the normal fashion by grinding, lathing etc.

In accordance with a second aspect of the present invention, a method of manufacturing a contact lens with an iris simulating pattern by moulding between a pair of moulds, each of which has a mould surface, comprises applying to one or both mould surfaces at least one design, and applying two or more designs in total, wherein the designs are transferred onto the appropriate surface of the contact lens during the moulding and curing thereof, and the designs transferred to the contact lens interact with each other to substantially cover the iris and to produce a coloured natural simulation of the iris of the eye when in use.

The designs may be applied to the moulding surface using any one of the standard application techniques currently used, for example, jet printing, lithography silk screen printing etc.

In a preferred embodiment of the present invention the designs are applied using printing cliches.

In a preferred embodiment of the second aspect of the present invention the method of manufacturing a contact lens further comprises
- inserting a predetermined amount of a liquid monomer material between the moulding surfaces;
- aligning the moulding surfaces with respect to one another so as to form a contact lens;
- polymerising the liquid monomer material; and
- removing and finishing the article formed into a contact lens.

It will be appreciated by those skilled in the art that the finishing of the article will involve no treatments to the surface, or surfaces, of the contact lens onto which the patterns have been transferred by the above operations.

Contact lens in accordance with any of the above detailed aspects of the present invention can be manufactured from any suitable liquid monomer material, for example any of the presently known materials, and, in particular, the general class of materials known as hydrogels.

Preferably, the liquid monomer is 2-hydroxyethyl methacrylate (HEMA).

In a preferred embodiment of the present invention, the designs are applied to the moulding surface using an ink or inks having a viscosity in the range of 1.0 to 5000 cps. In this invention the term ink is used to denote any dyed or pigmented solution or paste which is compatible with the particular material of the contact lens in question.

Apart from the viscosity condition applied to the ink another major criteria, from the invention point of view, is that the ink and the liquid monomer material from which the contact lens is formed are compatible with each other and do not react together or interact with one another to the detriment of the product. One of the factors that has to be considered from this aspect is how the ink and the liquid monomer material will behave with regard to thermal changes in the body of the contact lens. This is important as one of the standard methods employed in the curing of polymer materials, such as HEMA is heat, for example maintaining the formed products at 85° C. for a specified period of time. Therefore, if the ink and the liquid monomer material in their cured state have differing thermal expansion properties this can lead to thermal stressing in the finished lens.

Further, if the lens being manufactured is made from hydrogel material, the cured liquid monomer material from which the lens is formed is in what is called an xerogel state. In order to be placed in a condition suitable for use in the eye the cured liquid monomer material is hydrated to what is known as a hydrogel state. During the hydration the cured liquid monomer material undergoes a volume change, generally an expansion, which is dependent upon the actual monomer material. The ink material has to be able to cater for this aspect also.

As will be appreciated by those skilled in the art, the ink will normally, but not necessarily, comprise a powdered pigment which is suspended in a carrier material. The carrier material is, preferably, a monomeric material and most preferably a monomeric material of identical nature to that of the liquid monomer material.

Preferably, the ink is made with a monomeric carrier material that is the same as the liquid monomer material of the body of the contact lens.

In a preferred embodiment of the present invention the ink comprises a pigment material which is suspended in a monomeric carrier material which comprises 2-hydroxyethylmethacrylate.

As will be well appreciated by those skilled in the art the viscosity of the liquid monomeric material increases as the material is cured. Therefore, in accordance with a preferred embodiment of the present invention the viscosity of the ink, when it includes a carrier material which is a monomeric material, is adjusted by partially curing the ink prior to its application to the moulding surface or moulding surfaces.

In the case where two or more inks are applied the inks may be of differing viscosities so that they have differing characteristics, for example dispersion in the main body of the lens during the moulding, including curing of the contact lens in accordance with the present invention.

The use of multiple cliches in accordance with the present invention allows the application of more than one colour in different patterns, or the same colour so as to impart different depths of colour using different patterns. Therefore, preferably, the cliches designs are applied by pad printing to the mould surface or surfaces in at least two differing colours.

The iris simulating pattern as applied to contact lenses made in accordance with either the first or second aspects of the present invention is normally applied as a band which surrounds a central clear zone. When in use in the human eye the central clear zone essentially corresponds to the pupil and the band essentially corresponds to the iris of the human eye.

Further, contact lenses made in accordance with the present invention are used to mark the natural colour of the wearer's iris and give the appearance to a viewer that the wearer's irises are of a different colour. Specifically the colour provided by the band of the contact lenses which overlies the iris of the eye.

In performing this function it is preferable that the appearance given by the contact lens is as natural as is possible so that the contact lens looks natural, and not false, to any viewers. Therefore, in order to achieve this the contact lens should mimic the natural iris, and include all the components of the area of the eye covered by the contact lens.

In use the contact lens is placed over the cornea of the eye and covers part of the sclera immediately adjacent to the cornea. Therefore, in use the contact lens overlies the pupil, the iris and the limbal zone of the natural eye, masking out the iris and the limbal zone of the wearer's eye. Consequently, in order to provide a natural appearance to the viewer, preferably, the iris simulating pattern includes components which correspond to the iris pattern and the limbal zone of the human eye.

The iris pattern of the iris simulating pattern, which is the component which directly results in the apparent change of iris colour as viewed by the viewer is attributal to the interaction of the designs applied in accordance with the present invention.

As far as the limbal zone is concerned in the human eye this is a dark, almost black, ring that surrounds the iris. Therefore, in one particular embodiment of the present invention the component of the contact lens which simulates the limbal zone is provided by overlaying at least two of the designs as applied to this area. This gives the contact lens a depth of field to the colouring of the designs in this region and simulates the limbal zone of the human eye.

In an alternative arrangement in accordance with the present invention the limbal zone simulating pattern component is provided on one of the designs applied only. In this case the limbal zone simulating pattern is preferably a substantially continuous band of colour.

In one particular arrangement of the alternative arrangement a further design which solely consists of the limbal zone simulating component is applied in accordance with either the first or second aspects of the present invention.

It will be appreciated by those skilled in the art that the darker the appearance of the limbal zone simulation on the contact lens made in accordance with the present invention the more natural the contact lens will appear in the human eye. Therefore, preferably at least one of the designs applied, including where appropriate the further design which solely consists of a component which simulates the limbal zone of the human eye, is formed from an ink which is of a colour that is a good absorber of natural light, for example, black or very deep navy blue.

In the circumstances where the limbal zone simulating pattern is formed by the overlaying of at least two designs in the appropriate region, the designs are applied so that the darker colour, i.e. that which is the better absorber of natural light, will be furthest from the cornea when the contact lens is in use.

In a preferred embodiment of the present invention, two cliches are used to supply the required interacting patterns to a mould surface, whilst the other mould surface is left clear, which cliches comprise a first cliche having a dense design in the apparent colour to be given to the iris, and a second cliche having a less dense design to impart the variegated pattern of the iris in a differing colour.

BRIEF DESCRIPTION OF DRAWINGS

The invention will now be illustrated, by way of description of an example, with reference to the accompanying drawings in which.

DETAILED DESCRIPTION

Figure 1:
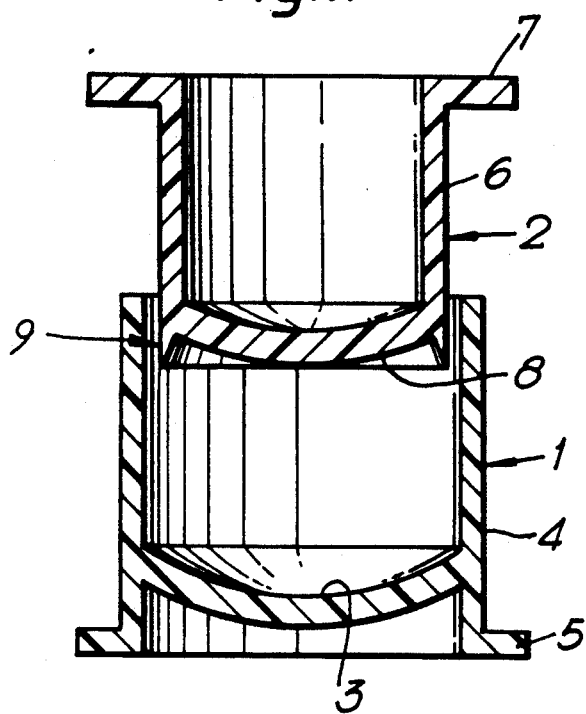
FIG. 1 shows a schematic representation of the two moulds in a separated condition for use in a method in accordance with the present invention.
Figure 2:
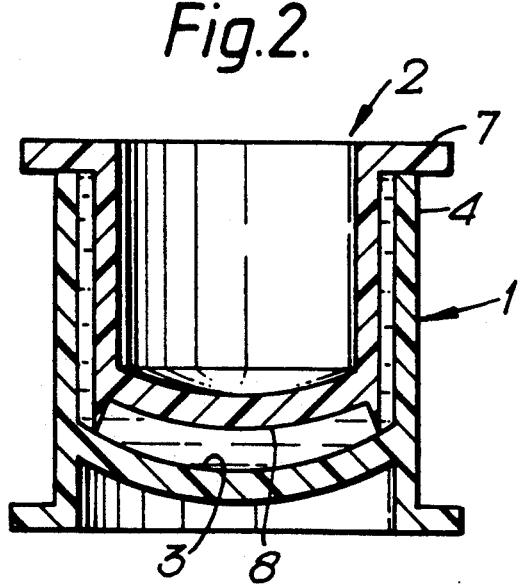
FIG. 2 shows a schematic representation of the two moulds shown in FIG. 1 in a moulding condition.

Now referring to FIGS. 1 and 2 of the accompanying drawings, there is shown a pair of moulds suitable for use in the manufacture of contact lens in accordance with the present invention. The moulds comprise a female mould 1 and a male mould.

The female mould 1 has a concave moulding surface 3 and a cylindrical wall section 4. At one of its ends the cylindrical wall section is provided with a foot section 5, whilst at the other end 6 the cylindrical wall section is merely left open to allow the male mould 2 to be inserted into the female mould 1.

The male mould 2 comprises a cylindrical member having a body, which at one end is provided with an outstanding collar 7 and at the other end is provided with a moulding surface 8. A shroud 9 is formed adjacent to the moulding surface 8 so that it circumferentially encloses the moulding surface 8.

When the male mould 2 is fully inserted into the female mould 1, the outstanding collar 7 of the male mould abuts the cylindrical wall section 4 of the female mould 2 at the open end thereof, and the shroud 9 comes into contact with the moulding surface 3 of the female mould.

In this way the shroud 9 and the moulding surfaces 3 and 8 of the moulds define a space in which the contact lens is formed.

Figure 3:
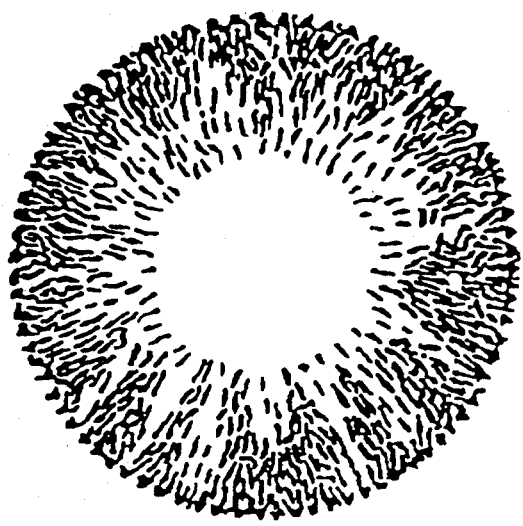
FIGS. 3 to 5 show a first combination of the designs for use in a method in accordance with the present invention.
Figure 4:
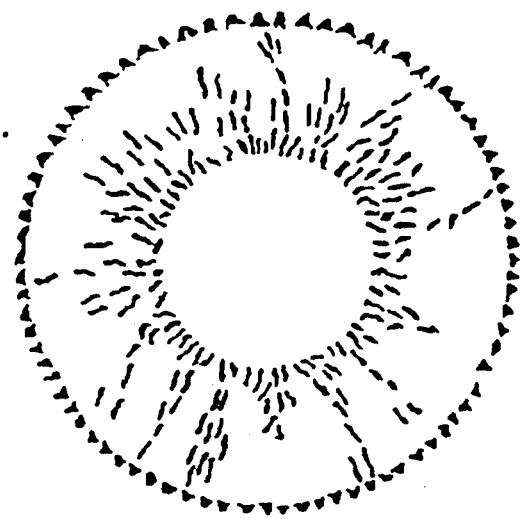

Now referring to FIGS. 3 and 4 of the accompanying drawings, there is shown a first arrangement of cliche designs suitable for use with a method of manufacture of a contact lens in accordance with the present invention.

The designs on the cliches shown in these figures, are intended to interact with one another so as to generate an iris simulating pattern in a contact lens which leads a viewer to believe that a wearer has eyes of a different colour to that of his natural eyes.

In this particular combination of cliche patterns the cliche shown in FIG. 3 is of a more dense design with the major congregation towards the periphery of the design. The cliche shown in FIG. 4 is of a less dense design with the major congregation towards the centre of the design. Both of the designs shown in these cliches contain a more defined outer ring section, which when the cliche designs are combined simulate the limbal zone of the human eye.

A majority of the designs shown on these cliches comprise irregularly sized and shaped islands of colour which are distinct with respect to one another. These islands of colour do not form a regularly repeating, and clearly arranged pattern within the design but an irregular/random pattern.

The designs shown in these cliches are applied to the moulding surface or surfaces of the moulds by a pad printing technique in a viscous ink. The pad printing technique is well known in the contact lens industry and no further information is required here.

In one arrangement of the present invention, the designs on the cliches are printed onto the moulding surface in different colours so that when ink is finally transferred and included into the surface of the contact lens, the cliche designs interact with one another to simulate the variegated pattern of the iris of the eye.

Alternatively, when the two cliche designs are applied in one colour, the effect produced in the final lens is that of areas of irregular intensities of the colour which simulates the natural iris of the eye.

Figure 5:
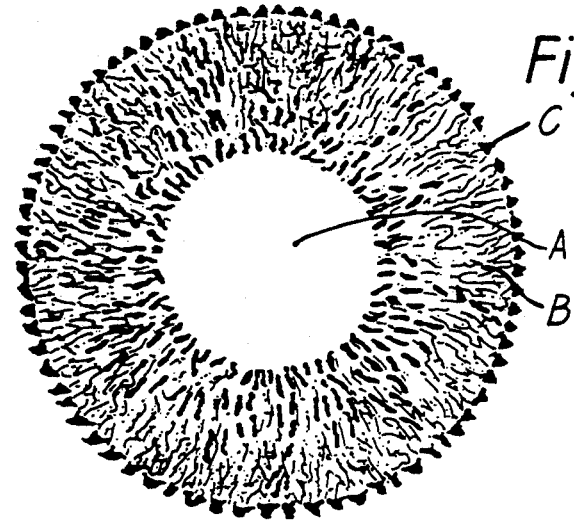

In combination, as shown in FIG. 5 of the accompanying drawings, the cliche designs interact and are partially superimposed so as to define
- a clear central portion, or pupil portion A;
- an iris simulation portion B, in this example the dense design applied to the cliche shown in FIG. 3 is a light grey colour, and the less dense design applied by the cliche shown in FIG. 4 is black; and
- a dark outer ring (Limbal) C.

Figure 6:
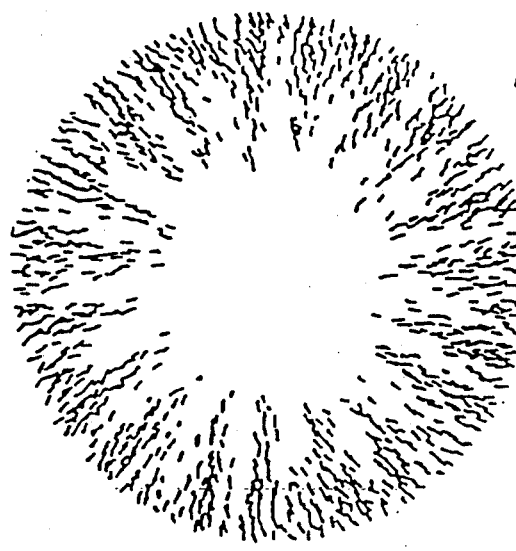
FIGS. 6 to 8 show a second combination of the designs for use in a method in accordance with the present invention.
Figure 7:
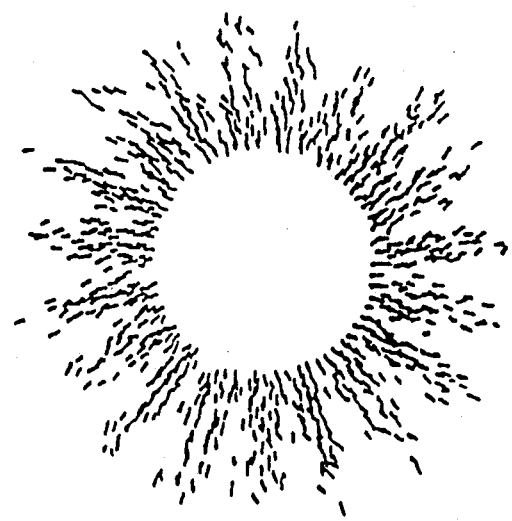
Figure 8:
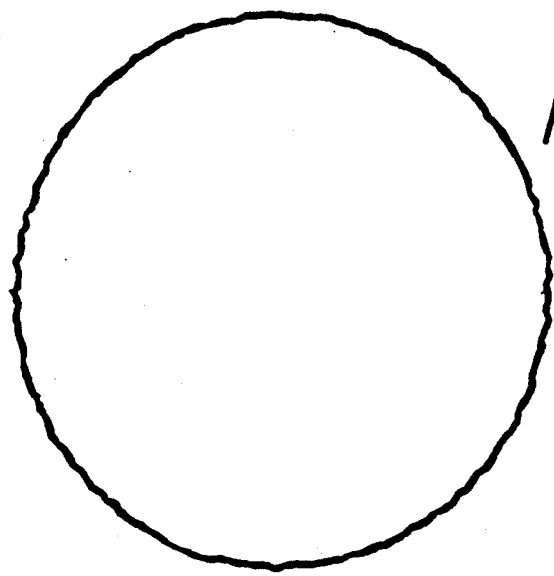

Now referring to FIGS. 6, 7 and 8 of the accompanying drawings, there is shown a second combination of cliches suitable for use with a method of manufacturing a contact lens in accordance with the present invention.

In this arrangement the figures are as follows
- FIG. 6 shows the denser outer peripheral iris simulating component design;
- FIG. 7 shows the less dense inner peripheral iris simulating component design; and
- FIG. 8 shows the limbal zone simulating component of the design.

As with the design shown in FIGS. 3 and 4 of the accompanying drawings the iris simulating component design shown in FIGS. 6 and 7 comprises irregularly sized and shaped islands which are distinct with respect to one another.

FIG. 8 is the further design which shows the limbal zone simulating component of the design and is a solid ring which surrounds the iris simulating components when the designs are applied.

Figure 9:
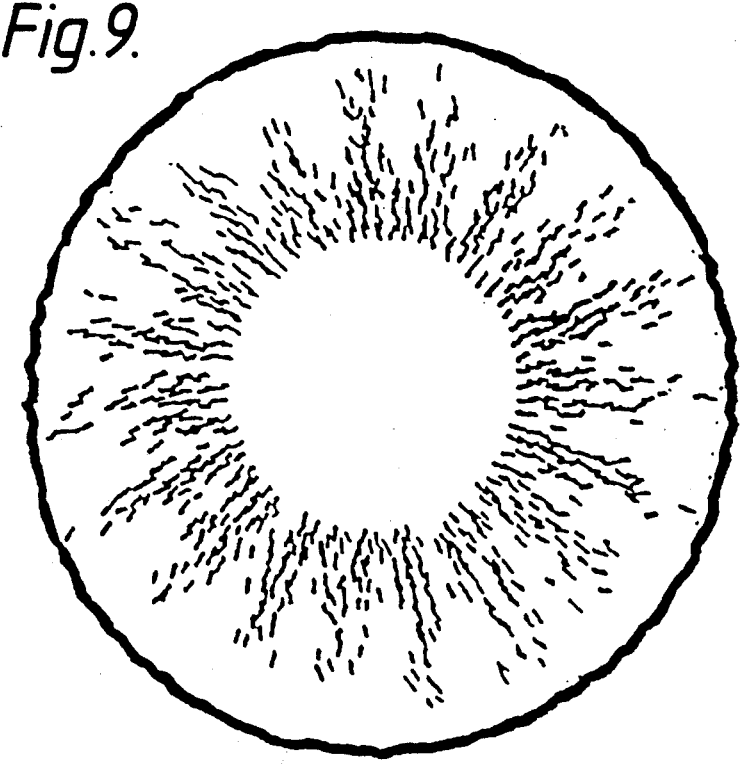
FIGS. 9 and 10 show a third combination of the designs for use in a method in accordance with the present invention.
Figure 10:
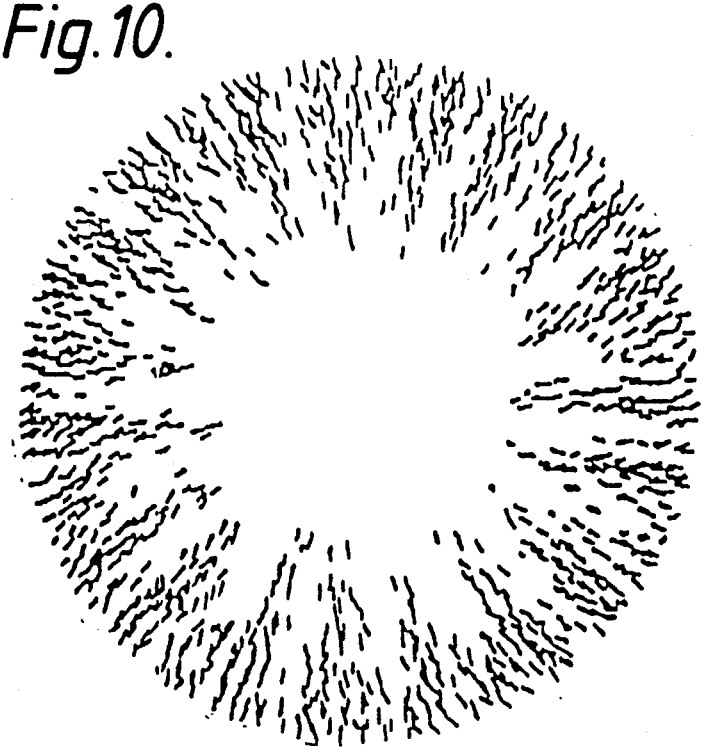

Now referring to FIGS. 9 and 10 of the accompanying drawings, there is shown a third combination of cliches suitable for use with a method of manufacturing a contact lens in accordance with the present invention.

In this particular combination the design shown in FIG. 9 is a combination of the designs shown in FIGS. 7 and 8 of the accompanying drawings, and FIG. 10 is identical to FIG. 6.

In accordance with the present invention the method of manufacturing a contact lens comprises:
  applying the first and second cliches to the moulding surface (B) so that the ink from which they are formed is transferred to the moulding surface and the designs interact and partially superimpose. They interact in the way illustrated in FIG. 5 of the drawings;

placing a predetermined amount of liquid monomer mixture, for example 2 hydroxyethylmethacrylate containing ethylene glycol dimethacrylate and a suitable initiator into the female mould 1;

inserting the male mould 2 into the female mould until the upstanding collar 7 on the male mould 2 abuts against the cylindrical wall section 4 of the female mould at the open end thereof and no air or gas is present in the space defined by the shroud 9 of the male mould and the moulding surfaces 3 and 8;

polymerising the liquid monomer mixture; and removing the formed article and finishing this to form the contact lens.

In an alternative method of manufacture, instead of applying the designs of the two cliches to the same moulding surface, the designs of the two cliches are applied so that one design appears on the moulding surface 8 and the other design appears on the moulding surface 3, for example the dense pattern of FIG. 3 on moulding surface 8 and the lighter pattern of FIG. 4 on moulding surface 3.

The ink applied to the moulding surface by the cliche designs is transferred to the surface of the contact lens during the polymerisation of the liquid monomer mixture. However, because of the nature of the operation the clearly defined lines from the cliches are dispersed in the polymer material giving a very diffused appearance of the cliche design to the surface of the contact lens into which they are formed.

The degree to which the cliche designs are diffused in the surface of the contact lens is clearly dependent upon the relative viscosities of the inks used on the cliche design and the liquid monomer mixture. In practice the viscosity of the ink can be chosen so that the required degree of diffusion of the ink is obtained, this may range from total diffusion to no diffusion whatsoever.

The degree of tinting of the contact lens made in accordance with the present invention is dependent upon the actual position in the area B shown in FIG. 5 on the contact lens. Although the covering of the tin with area B will be substantially complete, the degree of tinting will vary. Therefore the contact lens will have areas of heavy tint and areas of slight tint to produce a natural looking iris pattern.

EXAMPLE 1

The design as shown in FIG. 4 of the accompanying drawings was pad printed onto the moulding surface 8 of the male mould 2 using a black coloured ink.

The design as shown in FIG. 3 of the accompanying drawings is then pad printed to the moulding surface 8 of the male mould 2 using a blue ink of the following composition:

70 wt % - Hydroxyethylmethacrylate
16 wt % - Titanium Dioxide
9 wt % - Aluminium Chromium Cobaltous Oxide
2 wt % - Red Iron Oxide
1 wt % - Yellow Iron Oxide
2 wt % - Fused Silica A mixture of hydroxyethylmethacrylate/ethylene glycol dimethylacrylate containing benzoin methyl ether as a photoinitiator is added into the female mould. The male mould is placed into the female mould and polymerised under ultra violet radiation. Upon decapping and demoulding, lenses with desired pattern formed in the surface thereof are recovered. Lenses are finished through the routine procedures known to the industry.

EXAMPLE 2

As per example 1 except the blue ink is applied to moulding surface 8 and the black ink to moulding surface 3 of the male and female mould members respectively of FIG. 2 of the accompanying drawings

EXAMPLE 3

As per example 1 except the design as shown in FIG. 3 of the accompanying drawings is applied to the moulding surface 8 of the male mould 2 prior to the design as shown in FIG. 4 of the accompanying drawings.

EXAMPLE 4

As per example 1 except the blue ink is applied to moulding surface 3 and the black ink to moulding surface 8 of the female and male mould members respectively of FIG. 2 of the accompanying drawings.

EXAMPLE 5

The design as shown in FIG. 9 of the accompanying drawings was pad printed onto the moulding surface 8 of the male mould 2 using a black coloured ink.

The design as shown in FIG. 10 of the accompanying drawings is then pad printed to the moulding surface 8 of the male mould using a blue ink of the following composition:

70 wt % - Hydroxyethylmethacrylate
16 wt % - Titanium Dioxide
9 wt % - Aluminium Chromium Cobaltous Oxide
2 wt % - Red Iron Oxide
1 wt % - Yellow Iron Oxide
2 wt % - Fused Silica A mixture of hydroxyethylmethacrylate/ethylene glycol dimethylacrylate containing benzoin methyl ether as a photoinitiator is added into the female mould. The male mould is placed into the female mould and polymerised under ultra violet radiation. Upon decapping and demoulding, lenses with desired pattern formed in the surface thereof are recovered. Lenses are finished through the routine procedures known to the industry.

EXAMPLE 6

As per example 5 except the blue ink is applied to moulding surface 3 and the black ink to moulding surface 8 of the female and male moulds respectively of FIG. 2 of the accompanying drawings.

EXAMPLE 7

As per example 5 except the blue ink is applied to moulding surface 8 and the black ink to moulding surface 3 of the male and female moulds respectively of FIG. 2 of the accompanying drawings.

EXAMPLE 8

The design as shown in FIG. 8 of the accompanying drawings was pad printed onto the moulding surface 8 of the male mould 2 using a black coloured ink.

The design as shown in FIG. 7 of the accompanying drawings is pad printed to the moulding surface 8 of the male mould using a brown ink of the following composition:

70 wt % - Hydroxyethylmethacrylate
30 wt % - Brown Iron Oxide

The design as shown in FIG. 6 of the accompanying drawings is then pad printed to the moulding surface 8 of the male mould 2 using a blue ink of the following composition:

70 wt % - Hydroxyethylmethacrylate
16 wt % - Titanium Dioxide
9 wt % - Aluminium Chromium Cobaltous Oxide
2 wt % - Red Iron Oxide
1 wt % - Yellow Iron Oxide
2 wt % - Fused Silica A mixture of hydroxyethylmethacrylate/ethylene glycol dimethylacrylate containing benzoin methyl ether as a photoinitiator is added into the female mould. The male mould is placed into the female mould and polymerised under ultra violet radiation. Upon decapping and demoulding, lenses with desired pattern formed in the surface thereof are recovered. Lenses are finished through the routine procedures known to the industry.

EXAMPLE 9

As per example 5 except the design shown in FIG. 9 is applied to the moulding surface 8 in the same blue ink as FIG. 10 is applied.

EXAMPLE 10

As per example 5 except the design as shown in FIG. 8 of the accompanying drawings is applied to the moulding surface 8 of the male mould 2 after the designs shown in FIGS. 9 and 10 of the accompanying drawings have been applied. The designs shown in FIGS. 6 and 7 may also be applied to the moulding surface 8 of the male mould 2 in any suitable order, i.e. 6 before 7 or 7 before 6.

What we claim is:

1. A method of manufacturing a contact lens from a liquid monomer which comprises: forming at least one of the contact lens surfaces by moulding, and providing an iris simulating pattern from ink made with a monomeric carrier material that is the same as said liquid monomer, the method further comprising:
    applying a first ink design to a mould surface:
    applying a second differing ink design to a mould surface:
    placing a predetermined amount of said liquid monomer between mould halves positioned to mould at least said one contact lens surface:
    polymerising the liquid monomer:
    whereby the first and second ink designs are transferred to the contact lens, dispersed in the polymer, during the moulding and curing of the contact lens, and the designs transferred to the contact lens interact with each other to form an iris simulating pattern which is not reliant upon the structure of the natural iris of the eye to give a natural appearance in a different color.

2. The method of claim 1 wherein the first and second ink designs are applied to the same mould surface and that mould surface forms said one contact lens surface.

3. The method of claim 1 wherein the first ink design is applied to one mould surface and the second ink design is applied to another mould surface.

4. A method of manufacturing a contact lens as claimed in any of claims 2 or 3, wherein the designs are applied using printing cliches.

5. A method of manufacturing a contact lens, as claimed in claim 4 wherein the cliche designs are applied by pad printing and in at least two differing colors.

6. A method of manufacturing a contact lens as claimed in claim 5 wherein the viscosity of the ink is adjusted by partially curing the ink liquid monomeric carrier material.

7. A method of manufacturing a contact lens as claimed in claim 4, wherein the cliches comprise a first cliche having a dense design in the apparent colour to be given to the iris, and a second cliche having a less dense design to impart the variegated pattern of the iris in a differing colour.

8. A method of manufacturing a contact lens as claimed in any of claims 1, 2 or 3 wherein the liquid monomer includes 2 Hydroxyethyl methacrylate.

9. A method of manufacturing a contact lens as claimed in any of claims 1, 2 or 3, wherein the designs are applied to the moulding surface using an ink or inks with a viscosity in the range 1 to 5000 cps.

10. A method of manufacturing a contact lens as claimed in claim 9 wherein the liquid monomeric carrier material is 2 Hydroxyethyl methacrylate.

11. A method of manufacturing a contact lens as claimed in any of claims 1, 2 or 3, wherein the designs are applied to the moulding surface using an ink or inks with a viscosity in the range 100 to 500 cps.

12. A method of manufacturing a contact lens as claimed in claim 11 wherein the liquid monomeric carrier material is 2 Hydroxyethyl methacrylate.

13. A method of manufacturing a contact lens as claimed in any of claims 1, 2 or 3 wherein the viscosity of the ink is adjusted by partially curing the liquid monomeric carrier material thereof.

14. A method of manufacturing a contact lens as claimed in any of claims 1, 2 or 3, wherein the iris simulating pattern on the contact lens include components which simulate the iris pattern and the limbal zone of the human eye.

15. A method of manufacturing a contact lens as claimed in claim 14, wherein the component of the iris simulating pattern which simulates the limbal zone is provided by overlaying at least two of the designs applied in this area.

16. A method of manufacturing a contact lens as claimed in claim 15, wherein the designs are applied so that the design of darker colour will be furthest from the cornea when the contact lens is in use.

17. A method of manufacturing a contact lens as claimed in claim 14, wherein the limbal zone simulating component is provided on one of the designs only.

18. A method of manufacturing a contact lens as claimed in claim 17, wherein a further design which solely consists of the limbal zone simulating component is applied.

19. A method of manufacturing a contact lens as claimed in claim 18, wherein said further design is formed from an ink which is of a colour that is a good absorber of natural light.

20. A method of manufacturing a contact lens as claimed in claim 14, wherein at least one of the designs applied to form the iris simulating pattern is formed from an ink which is of a colour that is a good absorber of natural light.

* * * * *